(No Model.)
F. MORTIMER.
HANDLE FOR BICYCLES.
No. 580,336. Patented Apr. 6, 1897.
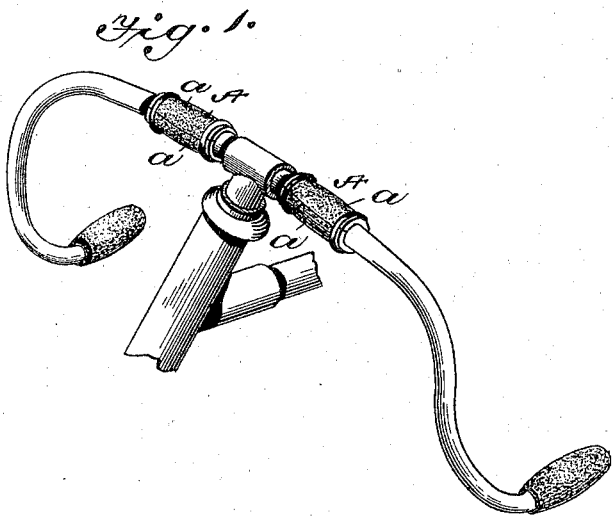
Fig. 1.
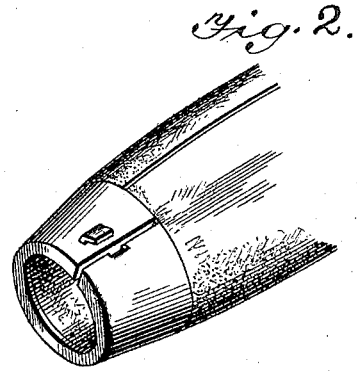
Fig. 2.
Fig. 3.
Inventor
Francis Mortimer
by E. H. Bates
Attorney
Witnesses

UNITED STATES PATENT OFFICE.

FRANCIS MORTIMER, OF NEW YORK, N. Y., ASSIGNOR TO FRANK BARTO, OF BROOKLYN, NEW YORK, AND RICHARD S. T. CISSEL, OF ELIZABETH, NEW JERSEY.

HANDLE FOR BICYCLES.

SPECIFICATION forming part of Letters Patent No. 580,336, dated April 6, 1897.

Application filed March 13, 1896. Serial No. 583,051. (No model.)

*To all whom it may concern:*

Be it known that I, FRANCIS MORTIMER, a citizen of the United States, residing at New York, in the county of New York and State of New York, have invented certain new and useful Improvements in Handles for Bicycles; and I do hereby declare the following to be a full, clear, and exact description of the invention, such as will enable others skilled in the art to which it appertains to make and use the same.

This invention has relation to improvements in bicycles; and it consists in the novel construction of an independent grasping-handle designed to be used in combination with the usual handles of a bicycle; and the invention consists in providing a divided grasping-handle adapted to be clamped to the bar of a bicycle between the usual handles thereof and the post of the same, all as will be hereinafter fully described.

The annexed drawings, to which reference is made, fully illustrate my invention, in which—

Figure 1 represents a perspective view of a bicycle handle-bar, showing my device applied thereto. Fig. 2 is a detail perspective view of the handle, and Fig. 3 is a cross-sectional view of the end of the handle.

Referring by letter to the accompanying drawings, A designates the independent handle, which is designed to be used in combination with the usual handles of a bicycle. This independent device or removable handle or handles comprise the handle proper and means for holding the same to the cross-bar or handle-bar of the bicycle, and the handles A are each divided longitudinally, presenting one or more pieces or sections $a$, which are properly curved internally to fit the handle-bar neatly and are held firmly by end metal bands.

In making my improvement I prefer to use cork or rubber, the same being cut or split longitudinally, which permits the handle to be opened on the side and passed over the handle-bar sidewise, when the same will close upon said bar and remain in position.

I do not wish to be confined to any particular manner of securing the removable handles to the handle-bar of a bicycle, as different devices may be used—for instance, a metal band $a'$, split horizontally and having a slot $b$ on one side of said slit and a hook $c$ opposite thereto, with an intermediate locking-plate $d$, having a slot, and a hook $f$, engaging the slot and hook in the bands.

It will be readily seen from the above description, when taken in connection with the annexed drawings, that my device can be easily and quickly attached and removed from a handle-bar of a bicycle by the rider simply opening the handle A where the same is cut or slit and applying it sidewise to the handle-bar. After the device is in place it closes around said handle-bar, and a device as above described permits the rider to ride leaning forward, when desired, and also to sit upright, and when in an upright position riding the rider grasps the independent handles, and they serve to prevent the handle-bar from becoming soiled or tarnished.

A device as herein described is simple in operation, easily and quickly applied to a bicycle handle-bar, and as quickly removed, as well as being durable and cheap to manufacture.

Having thus described my invention, what I claim, and desire to secure by Letters Patent, is—

As an improved article of manufacture, the herein-described handle for bicycles, comprising the independent grasping-handle divided longitudinally presenting one or more pieces or sections properly curved internally to fit the handle-bar neatly and the metal end bands for holding the grasping-handle firmly, each end band being provided with a slot and a hook opposite thereto, and an intermediate locking-plate having slot and a hook engaging the slots and hooks in the metal bands, substantially as described.

In testimony whereof I affix my signature in presence of two witnesses.

FRANCIS MORTIMER.

Witnesses:
J. W. BECKWITH,
NELLIE B. MORTIMER.